OR 3,627,401

SEARCH ROOM x 3048 R

[11] 3,627,401

[72] Inventor Joseph P. Kirk
Endwell, N.Y.
[21] Appl. No. 801,520
[22] Filed Feb. 24, 1969
[45] Patented Dec. 14, 1971
[73] Assignee International Business Machines Corporation
Armonk, N.Y.

[54] BINARY-CODED HOLOGRAM RECORDING SYSTEM
1 Claim, 6 Drawing Figs.

[52] U.S. Cl. .......... 350/3.5, 346/108, 350/150
[51] Int. Cl. .......... G02b 27/00
[50] Field of Search .......... 350/162, 3.5; 346/1, 108; 340/173

[56] References Cited

UNITED STATES PATENTS

| | | | |
|---|---|---|---|
| 3,312,955 | 4/1967 | Lamberts et al. | 340/173 |
| 3,407,405 | 10/1968 | Hoadley | 346/108 |
| 3,408,656 | 10/1968 | Lamberts | 346/1 |

OTHER REFERENCES

Grobin et al. IBM Technical Disclosure Bulletin, Vol. 10 No. 3, Aug. 1967 pp. 282– 3

*Primary Examiner*—David Schonberg
*Assistant Examiner*—Ronald J. Stern
*Attorneys*—Hanifin and Jancin and Andrew Taras

ABSTRACT: The invention relates to an information storage system in which the basic storage element is a hologram. Information is recorded (or written) by selectively orienting the plane of polarization of either the reference beam or the information beam as the two beams converge upon the hologram.

INVENTOR
JOSEPH P. KIRK

BY [signature]

AGENT

BINARY-CODED HOLOGRAM RECORDING SYSTEM

BACKGROUND OF THE INVENTION

Since the discovery of the laser beam progress has been made in applying a laser beam to storage systems in which the hologram is used as the basic storage element. In holographic storage systems of the prior art in the construction of the hologram plate followed well-known established concepts, namely, that of capturing in the photographic film, or the like, the interference pattern resulting from the interaction of a reference beam with an information carrying beam, both being derived from a coherent light source.

SUMMARY

The present invention no the other hand introduces a novel and unique concept by capturing on the photographic film, or the like, the intensity pattern derived by the interference of selectively polarized reference and information component beams.

In the embodiment of the invention an array of electro-optic crystals is utilized to selectively cause changes in the planes of polarization of the information beams in relation to the plane of polarization of the reference beam such that when the beams have their respective planes of polarization oriented in the same direction, the resulting interference pattern has a modulation in intensity. Conversely, when the planes of polarization are orthogonal to each other, the resulting interference pattern has no modulation in intensity. The intensity modulation is utilized as the basis for writing "one's" and "zero's" to indicate any binary configuration which in the computer art is referred to as a word of information or data.

Generally speaking, a hologram is a photographic film that has recorded thereon the intensity modulation produced by the interacting segments of the same beam of light. The source of the high-intensity beam is usually a laser and the beam is split into two segments. In the case of a transparent object, for example, a transparency bearing coded information, one segment of the beam passes therethrough and is called the information beam. This beam and the second segment, called the reference beam, are made to converge and cause the intensity modulations to be formed in the photographic film. When the film is developed and properly supported, it forms the hologram.

When the hologram is utilized as a storage medium in the computer art, the information patterns are usually those derived in the manner described above, from the information beam segment passing through the transparency in which the coded information is stored, the coded information being any binary pattern of transparent and opaque spots representing data of one sort or another.

In large scale holographic storage systems the exorbitant amount of time required in producing the holograms is a decided disadvantage. The present invention is thus directed to producing holograms suitable for mass storage media in a relatively short time with a considerable reduction in cost.

The principal object of the invention is to provide an information storage means employing a novel combination of polarized light beams.

Another object is to provide a high-speed storage system in which the basic storage medium is a hologram plate bearing information patterns resulting from intensity variations produced by the unique combination of polarized light beams.

A specific object resides in the use of electro-optic crystals for varying the states of polarization of one of the two polarized beams employed in the formation of intensity patterns.

A more specific object is to provide a hologram storage medium cheaper and faster than those provided by the prior art systems.

The foregoing and other objects, features and advantages of the invention will be apparent from the following more particular description of a preferred embodiment of the invention, as illustrated in the accompanying drawings.

DESCRIPTION OF THE DRAWINGS

Referring to FIG. 1 there is shown schematically a system for recording multiple holograms. A plurality of spaced reference beam sources R1, R2, R3, R4 are arranged along a vertical axis V and a plurality of information beam sources B1, B2, B3, B4 are arranged along a horizontal axis H. The laser beams emanating from the sources interact with one another at a hologram plane whereat a photographic film is suitably placed.

For each of the desired combinations of information beams, a different one of the reference beams R1 through R4 is used in the recording process. The technique for storing multiple patterns on the same film is accomplished by successive timed exposures and for practical considerations as many as 500 exposures can be made to provide a hologram with acceptable signal to noise characteristics. It can be appreciated that the number of different reference beam sources and information beam sources will dictate the number of different patterns that can be recorded on the hologram.

In reading out the recorded information patterns in the hologram, the latter is placed in the position that it occupied during the construction process. The various reference beam sources R1 through R4 are selectively controlled to direct an appropriate reference beam through the hologram, sources B1–B4 being turned off during readout operations. The beams exiting from the hologram is directed through a lens to provide a beam which produces an exact image of the original coded information supplied by the information beams derived from the sources B1 through B4. Thus by selectively controlling any reference beam, an appropriate coded information beam will be read out from the hologram. These coded beams can be translated into coded electrical signals by means of a coordinate array of light-responsive cells placed at the focal plane of the lens and in a position oriented to receive the first order diffraction patterns which are spaced from the zero order pattern masked out by a suitable mask.

Figure 2:
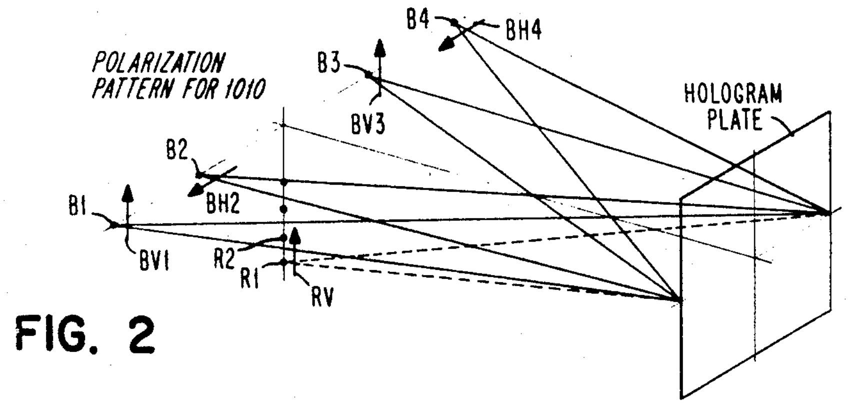
FIGS. 2 and 3 show various states of polarization in the information and reference beams in writing on a hologram plate intensity patterns representing the binary words 1010 and 1011 respectively.
Figure 3:
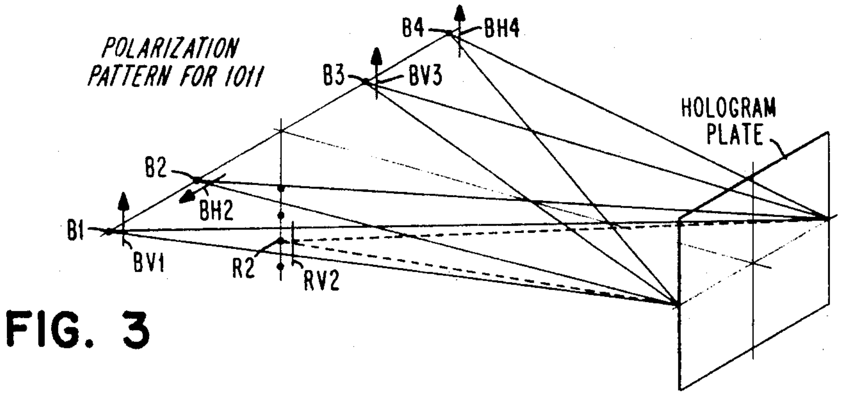

FIGS. 2 and 3 show schematically how the present invention is implemented to control the planes of polarization of the information beams and reference beams to provide appropriate recordings of binary word values 1010 and 1011 respectively on the hologram during a recording operation. Specifically referring to FIG. 2, the reference beam source R1 is on, providing a beam whose plane of polarization is oriented in the direction of the vertical arrow RV. At the same time the coded information beam derived from sources B1, B2, B3 and B4, is comprised of a polarization pattern wherein sources B1 and B3 provide beams in which their planes of polarization are oriented in a vertical direction as indicated by arrows BV1 and BV3, the direction of the latter being the same as that issued by the reference beam source R1. At the same time, information beam sources B2 and B4 provide beams whose planes of polarization are oriented at 90° as indicated by arrows BH2 and BH4, with respect to the vertically oriented arrows BV1, BV3 and RV. The effect of this combination of polarization is to produce an intensity pattern during a timed exposure of the hologram plate which pattern when read out during a readout operation produces an image of the binary value 1010.

FIG. 3 shows schematically the polarization pattern for recording the binary value 1011. From an inspection of the arrow orientations in this drawing, it will be seen that the information beam source B4 provides a beam whose plane of polarization is oriented in the direction indicated by the vertical arrow BH4, all other information arrows, namely, BV1, BH2 and BV3, being oriented in a manner similar to that shown for the corresponding arrows shown in FIG. 2. The reference source R2 is now on, rather than R1, to provide a different spatial orientation for the reference beam whose plane of polarization is oriented in the direction of the vertical arrow RV2. This second polarization pattern interacting with the reference beam issuing from reference source R2 provides an interacting pattern different from that generated in FIG. 2 and will cause the previously recorded pattern representing the value 1010, to be further modulated by the second interacting pattern representing the value 1011. The resulting modulated pattern represents a summation of the two modulations and this process of summations of all modulations progresses as each new interaction pattern is recorded.

In the above examples of recording, the binary "1" value is arbitrarily assigned when the plane of polarization in both reference and information beams is the same, whereas a binary "zero" value is assigned when the plane of polarization of the reference and information beams are orthogonal to each other.

Since the average exposure level of the film upon which the patterns are successively recorded will be the same regardless of the number of "1" recorded, all of the intensity patterns in all of the multiple recorded holograms will lie in the same portion of an intensity versus log exposure curve for the particular film being used.

Figure 4:
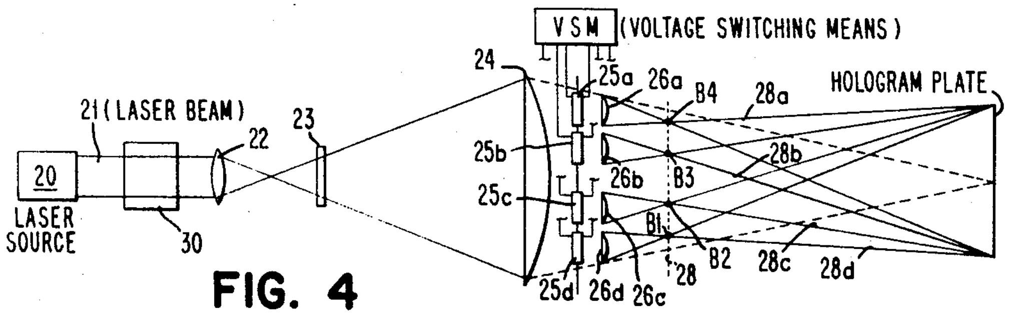
FIGS. 4 and 5 show plan and elevation views of an optical system for preparing a hologram.
Figure 5:
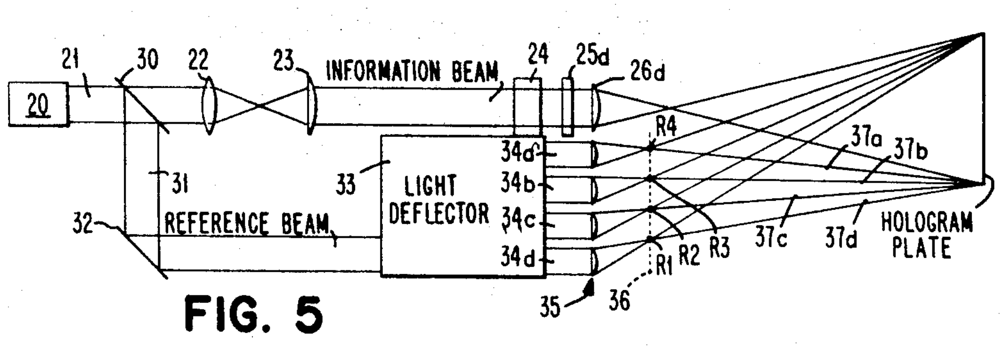

The invention as constituted in FIGS. 4 and 5, representing plan and elevation views, comprises a laser light source 20 which issues a beam 21, of coherent light that passes through an optical system constituted of an expander lens 22, cylindrical condenser lenses 23 and 24. To the right of the lens 24 is a horizontal array of electro-optic crystals ***25a*, *25b*, *25c*, *25d* and a horizontal arrangement of minute lenses *26a*, *26b*, *26c*, *26d* optically aligned with the crystals. The foci of these minute lenses 26 lie on a horizontal line 28 and represent the various information beam sources B1, B2, B3, B4 described hereinbefore. The crystals *25a*–*25d* are electrically interconnected to a voltage switching means VSM which selectively applies voltages necessary to cause formation of different polarization patterns by the information beams *28a*, *28b*, *28c*, *28d***. These different beam patterns in combination with a selected reference beam are directed upon the hologram plate during the recording operation, to provide thereon the different intensity patterns representing different forms of information.

The manner of generating the reference beam segment will be more readily explained from the drawing of FIG. 5 which shows a beam splitter 30 interposed in the path of the beam 21 to cause a segment 31 thereof to be directed by way of a mirror 32 to a light deflector 33 which provides spatially oriented polarized output beams *34a* through *34d* selectively directed through an array of lenses 35 whose foci, lying on a horizontal line 36, represent the reference beam sources R1 through R4 described hereinbefore, from which issue selectively polarized reference beams *37a* through *37d*. The interaction between a selected one of the latter beams with the information beams produce on the hologram intensity patterns which are a function of the polarization states of the beams.

Figures 1, 6:
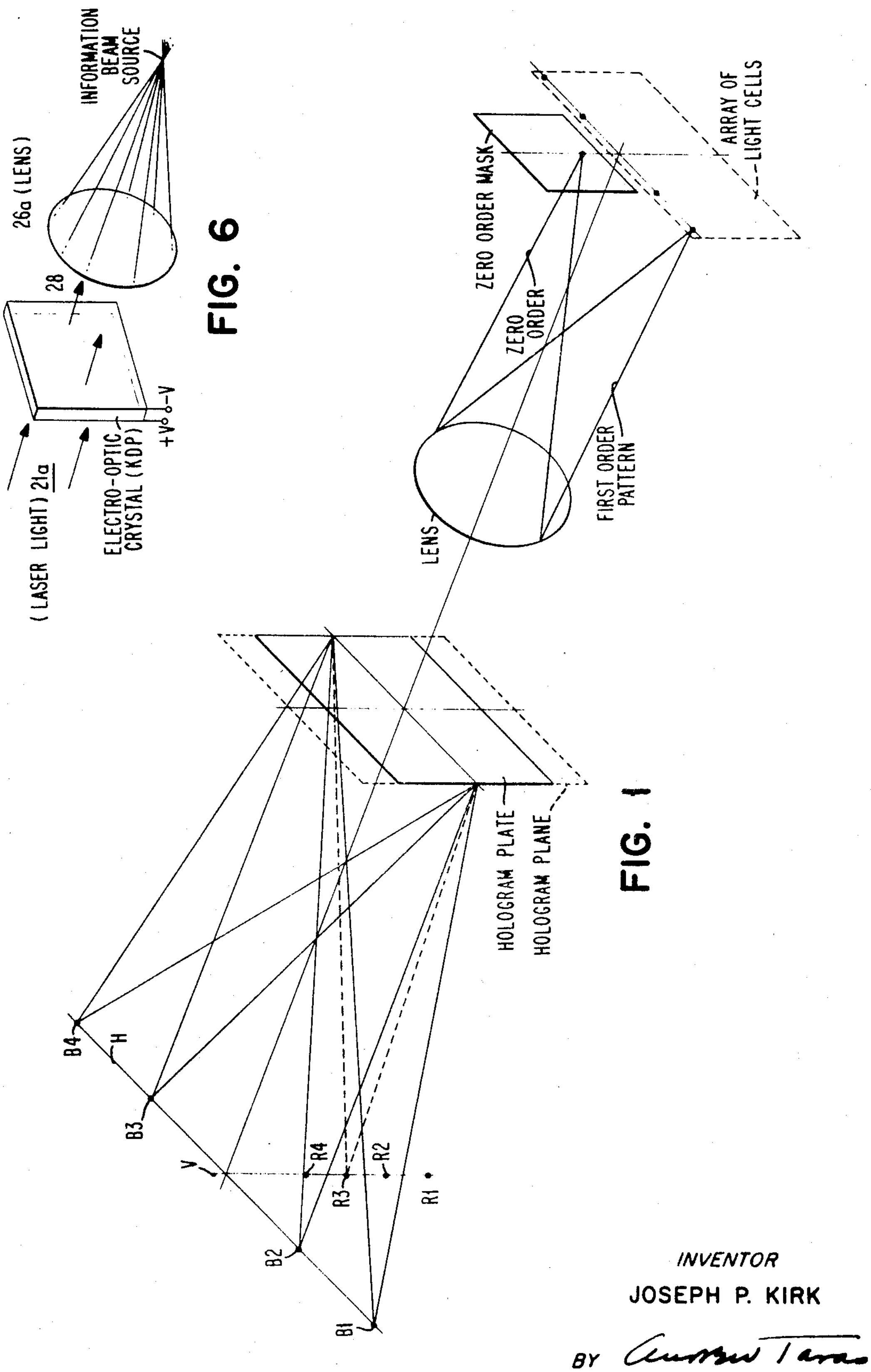
FIG. 1 shows schematically an arrangement for writing information on the hologram plate and reading the information therefrom.
FIG. 6 shows a detail of the optical system associated with one bit position.

The detail of FIG. 6 shows an electro-optic crystal, for example, a KDP crystal, to which a voltage is applied to cause rotation of the plane of polarization of an incident laser light beam *21a*. The plane of polarization of the exiting beam 28 is oriented differently from that of the incident beam *21a* by an amount which is a function of the applied voltage. In the absence of a voltage, the light passes through the crystal undisturbed insofar as the plane of polarization is concerned. The lens *26a* brings the exiting light beam to a focal point which corresponds to the information beam source, for example, any one of the sources B1 through B4.

The array of minute lenses ***26a*–*26d*** could very well be fabricated as a single array commonly known as the "fly's eye" lens, which would provide information sources of very high density.

The electro-optic crystals which are shown as independent crystals may also take the form of a single large crystal having an array of coordinate electrodes with a random-type switching means for selection of discrete local areas to perform the function of switching the polarization of narrow portions of the incident light beam.

An expedient which would result in a reduction of the applied voltage to the electro-optic crystals would be to use a reflecting configuration with the crystal acting as a thick mirror whereby the light would make a double pass through the crystal.

In actual practice a word would be a large array of bits. FIG. 6 would be one element in this array and could possible be part of a face plate of a cathode-ray tube where local charged regions of the electro-optic crystal would be the bit position not recorded. The number of words written in this serial form of recording would be limited by consideration described in a reference titled "Incoherent Holography." (Adam Kozma, "Invited Paper Th A2 *Incoherent Holography*'," 1968 Spring Meeting of Optical Society of America). For this reason it might be desirable to write several words during one exposure. The physical placement of information bit positions and reference source positions would be dictated in part by consideration of size and in part by consideration of nonlinear effects in holography as described by G. W. Jull & A. Kozma in a Paper ThG15, titled "Experimental Study of Nonlinear Effects in Holography"; and also a paper by A. Kozma, titled "Optica Actu 15 (1968)."

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A holographic system for recording interference patterns representing binary coded information on a recordable holographic medium comprising a coherent light source for issuing a coherent light beam, a beam splitter interposed in said coherent light beam for providing a main information beam and a reference beam, an optical lens system interposed in said main information beam for providing a plurality of fixed point sources of light each yielding a component information beam and directing the beams upon said medium, all said fixed sources being spatially separated from each other along a single line of given orientation, an electro-optic means disposed in proximity to said optical lens system for selectively controlling the polarization states of each of said plurality of component information beams, a light deflector interposed in the path of said reference beam for providing a plurality of fixed point sources of light each yielding an individual reference beam and directing the beams, each at a unique angle, upon said medium; all said reference point sources being spatially separated from each other along a single line having an orientation orthogonal to said line of given orientation, said light deflector further including a plurality of electro-optic means for selectively controlling the polarization states of each of said plurality of individual reference beams, and voltage control means for impressing upon said electro-optic means and said light deflector different combinations of electrical signals to produce different combinations of polarization states in said individual reference and information beams whereby interference patterns representing said binary-coded information are produced.

* * * * *